United States Patent
Larson et al.

(10) Patent No.: US 10,222,823 B2
(45) Date of Patent: Mar. 5, 2019

(54) COMPUTING APPARATUS WITH REAL TIME CLOCK WITHOUT A BATTERY

(71) Applicant: Intel Corporation, Santa Clara, CA (US)

(72) Inventors: Thane M. Larson, Portland, OR (US); Ramamurthy Krithivas, Chandler, AZ (US); Chris Ruffin, Chapin, SC (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 14/750,159

(22) Filed: Jun. 25, 2015

(65) Prior Publication Data

US 2016/0378135 A1 Dec. 29, 2016

(51) Int. Cl.
G06F 1/14 (2006.01)
G06F 9/4401 (2018.01)
G06F 1/3203 (2019.01)

(52) U.S. Cl.
CPC .............. *G06F 1/14* (2013.01); *G06F 9/4401* (2013.01); *G06F 1/3203* (2013.01)

(58) Field of Classification Search
CPC ......... G06F 1/14; G06F 9/4401; G06F 1/3203
See application file for complete search history.

(56) References Cited

U.S. PATENT DOCUMENTS 5,542,077 A * 7/1996 Johnson .............. G06F 11/1417 713/300
7,197,657 B1 * 3/2007 Tobias ...................... G06F 1/14 713/400
2004/0073842 A1 * 4/2004 James ................. G06F 11/1417 714/36
2008/0034239 A1 * 2/2008 Lambert ................... G06F 1/14 713/323
2008/0089313 A1 * 4/2008 Cayo ...................... H04L 43/00 370/345
2011/0231641 A1 * 9/2011 Musha ................. H04J 3/0697 713/2
2012/0166784 A1 * 6/2012 Peng ................... G06F 11/1417 713/2
2012/0233487 A1 * 9/2012 Okano ..................... G06F 1/14 713/400

* cited by examiner

*Primary Examiner* — Jaweed A Abbaszadeh
*Assistant Examiner* — Gayathri Sampath
(74) *Attorney, Agent, or Firm* — Schwabe, Williamson & Wyatt, P.C.

(57) ABSTRACT

The present disclosure describes embodiments of apparatuses and methods related to a computing apparatus with a real time clock (RTC) coupled to a bus, where the RTC does not have a backup power source to maintain time and date of the RTC. The computing apparatus may have firmware coupled to the bus, and the firmware may contain boot logic with network time protocol (NTP) logic. The computing apparatus may have persistent memory coupled to the bus with configuration parameters. The computing apparatus may have a controller coupled to the bus, where the controller is to retrieve the configuration parameters from the persistent memory and processes the boot logic with the NTP logic using the configuration parameters to transmit an NTP request over the bus and receives a coordinated universal time (UTC) over the bus and stores the UTC in the RTC.

22 Claims, 3 Drawing Sheets

COMPUTING APPARATUS WITH REAL TIME CLOCK WITHOUT A BATTERY

FIELD

Embodiments of the present disclosure generally relate to the field of computing apparatuses with real time clocks without a backup battery for retaining the real time clock.

BACKGROUND

A battery for a real time clock (RTC) is used in computers and servers to provide power to the RTC. The battery may be a backup power source when the primary power source, such as an AC power source, is absent. Super capacitors may be used instead of a battery. The battery may be a primary source of power to a RTC. When a battery is providing power to a RTC, the battery maintains power to a memory of the RTC to maintain the data stored in the memory, as well as running the RTC. This data includes date and time and configuration parameters used by hardware state machines, boot firmware, such as basic input output operating system (BIOS), Unified Extensible Firmware Interface (UEFI), or coreboot, to configure a computer or server for handoff to and operation by an operating system. The RTC memory may be referred to as a non-volatile (NV) random access memory (RAM) or complementary metal oxide (CMOS) RAM; however, the memory is volatile and hence the data stored in the memory will be lost without a primary and/or backup power source. In some computers or servers, removal of a RTC battery provides a mechanism to reset a computer or server to a default mode. This reset may be necessary as a result of a computer or server becoming inoperable as a result of a security violation or perceived security violation. There are drawbacks to using batteries to power a RTC. First, batteries add expense. Second, batteries have a limited lifetime, typically about 5 years. Third, batteries are subject to regulations regarding toxic material disposal because of the chemicals used in batteries. Finally, batteries are relatively large, taking up valuable board area.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe apparatuses and methods for setting a real time clock in a computing apparatus where the primary power source that powers the computing apparatus is the only power source for the real time clock, and associated techniques and configurations.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the terms "module" and/or "circuitry" may refer to, be part of, or include an Application Specific Integrated Circuit (ASIC), an electronic circuit, a system-on-chip (SoC), a processor (shared, dedicated, or group), and/or memory (shared, dedicated, or group) that execute one or more software or firmware programs, a combinational logic circuit, and/or other suitable components that provide the described functionality.

The term "logic" may refer to computing logic embedded in circuitry of a computing apparatus and/or computing logic stored in a memory of a computing apparatus, wherein the logic is accessible by a processor of the computing apparatus to execute the computing logic to perform computing functions. By way of example and not limitation, logic may be embedded in various types of memory and/or firmware, e.g. silicon blocks of various chips and/or processors. Logic may be in various circuitry, e.g. radio circuitry, receiver circuitry, control circuitry, transmitter circuitry, transceiver circuitry, and the like. By way of example and not limitation, logic may be embedded in volatile memory and/or non-volatile memory, including random access memory, read only memory, programmable memory, magnetic memory, flash memory, persistent memory, and the like.

Figure 1:
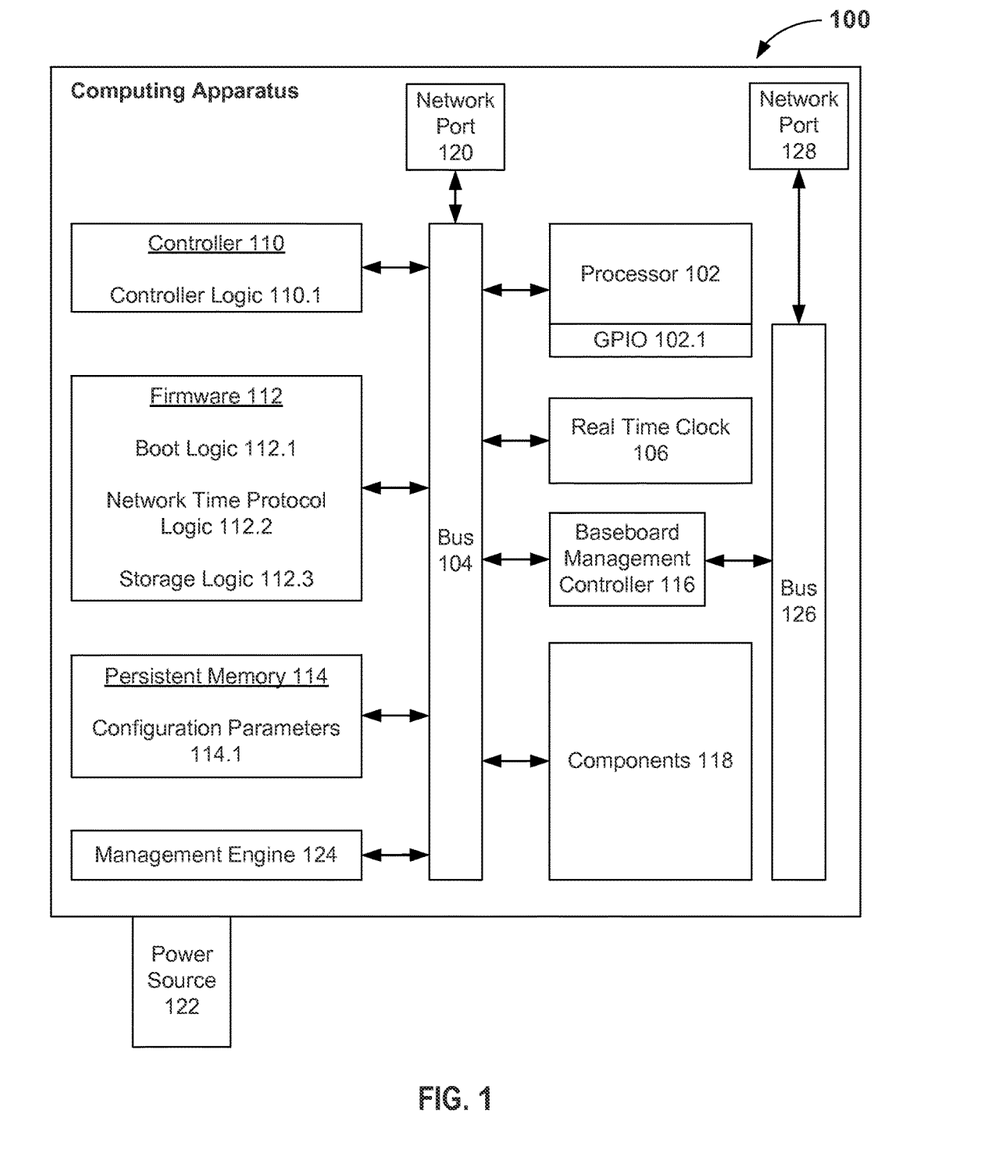
FIG. 1 schematically illustrates a computing apparatus 100 with a real time clock 106 with the primary power source 122 that powers the computing apparatus 100 and is a source of power for the real time clock 106, in accordance with some embodiments.

FIG. 1 schematically illustrates a computing apparatus 100 with a real time clock 106 with the primary power source 120 that powers the computing apparatus 100 and is a source of power for the real time clock 106, in accordance with some embodiments. In some embodiments, the computing apparatus 100 may be referred to as an apparatus for computing. In some embodiments, the real time clock (RTC) 106 may have a non-volatile random access memory (NVRAM) typical of an RTC. The NVRAM of a RTC may be referred to as a complementary metal oxide (CMOS) random access memory. The RTC 106 may not have an NVRAM typical of an RTC but may have only sufficient memory needed to maintain the time and date after the computing apparatus 100 stores the time and date into the RTC when the computing apparatus has power from power source 120. In some embodiments, the RTC 106 does not maintain time and date when power source 120 no longer provides power to computing apparatus 100. In some embodiments, the RTC 106 may maintain time and date when power source 120 no longer provides power to computing apparatus 100. In some embodiments, the RTC may have a backup source of power. In some embodiments, the backup source of power may be a battery and/or a capacitor and/or some other energy storage device such as an inductor and/or an inductor/capacitor device. In some embodiments, the backup source of power may provide backup power for a short time such as a one second or less. In some embodiments, the backup power source may be a temporary transient source of power to prevent loss of time and date of the RTC upon a short term loss of power from power source 120. In some embodiments, the backup source of power may provide power for days, weeks, months, or years. In some embodiments, the RTC may have a persistent memory coupled to the RTC. In some embodiments, the persistent memory may be a flash memory or the like.

In some embodiments, the power source 120 may be an AC power source or a DC power source. In some embodiments, the AC power source may be as low as 100v AC source. In some embodiments, the AC power source may be as high as a 240v AC source. In some embodiments, the AC power source may be as provided in various locations and/or countries. In some embodiments, the DC power source may be a backup power source when there is a loss of AC power. In some embodiments, the computing apparatus 100 may include RTC 106 that is coupled to a bus 104. In some embodiments, the bus 104 may include one or more of internal and/or external computer buses commonly used in computing systems including server type computing systems such as tower, rack, and/or blade servers, e.g. one or more of serial and/or parallel type buses. In some embodiments, the RTC 106 may be without a backup power source to maintain time and date of the RTC 106. In some embodiments, the computing apparatus 100 may include firmware 112 coupled to the bus 104. In some embodiments, the firmware 112 may include boot logic 112.1 with network time protocol (NTP) logic 112.2. In some embodiments, the firmware 112 may be embedded in silicon of a device coupled to the bus 104. In some embodiments, firmware 112 may be embedded in silicon of controller 110 coupled to bus 104. In some embodiments, firmware 112 may be updateable. In some embodiments, firmware 112 may include further logic. In some embodiments, firmware 112 may be embedded in silicon of a management engine 124 coupled to bus 104.

In some embodiments, controller 110 may be a power management controller. In some embodiments, controller 110 and management engine 124 may be a single device. In some embodiments, controller 110 and management engine 124 may have a direct communications bus (not shown) between the same. In some embodiments, boot logic 112.1 may be basic input/output system (BIOS) boot logic. In some embodiments, boot logic 112.1 may be Extensible Firmware Interface (EFI) boot logic or Unified Extensible Firmware Interface (UEFI) boot logic. In some embodiments, boot logic 112.1 may be coreboot boot logic. In some embodiments, the computing apparatus 100 may include persistent memory 114 coupled to the bus 104. In some embodiments, the persistent memory 114 may include configuration parameters 114.1. In some embodiments, persistent memory 114 may be a flash memory or the like. In some embodiments, persistent memory 114 may be embedded in silicon of a device coupled to the bus 104. In some embodiments, persistent memory 114 may be embedded in silicon of controller 110 coupled to bus 104. In some embodiments, persistent memory 114 may be updateable. In some embodiments, persistent memory 114 may be embedded in silicon of a management engine 124 coupled to bus 104. NTP refers to the commonly known networking protocol for clock synchronization between computer systems over packet-switched variable-latency data networks. NTP is intended to synchronize all participating computers to within a few milliseconds of Coordinated Universal Time (UTC).

In some embodiments, the computing apparatus 100 may include a controller 110 coupled to bus 104, as describe previously. In some embodiments, controller 110 may retrieve configuration parameters 114.1 from the persistent memory 114. In some embodiments, controller 110 may process the boot logic 112.1 with the NTP logic 112.2 using the configuration parameters 114.1 to transmit an NTP request over the bus 104 and to receive a UTC over the bus 104 and to store the UTC in the RTC 106. In some embodiments, the controller 110 may process the boot logic with the NTP logic using the configuration parameters to set parameters of components 118 of the apparatus. Components 118 may include commonly specified chips, modules, circuits, internal and external components, input devices, output devices, networked devices, and/or other devices of computers, servers, and various types of computing apparatuses, including mobile type devices. In some embodiments, the computing apparatus 100 may include a network port 120 coupled to the bus 104, where the controller 110 may transmit the NTP request over the network port 120 to a NTP server (not shown) and may be received over the network port 120 from the NTP server the UTC and store the UTC in RTC 106. In some embodiments, the computing apparatus 100 may include a baseboard management controller (BMC) 116 coupled to the bus 104. In some embodiments, the BMC may be a local multinode BMC and may be used as a source of NTP server for NTP requests. In some embodiments, the controller 110 may transmit the NTP request over the bus 104 to the BMC 116, and the controller 110 may be received from the BMC 116 the UTC and store the UTC in the RTC. The BMC may be coupled to a bus 126. Bus 126 may include one or more serial and/or parallel buses commonly used in computing apparatuses including servers. Bus 126 may be coupled to network port 128. Bus 126 may be a system management bus (SMBUS). BMC 116 may obtain the UTC from a NTP server (not shown) through network port 128 or through network port 120. The NTP server may be a remote NTP server or may be local NTP server such as another server device within a network of servers coupled to the network port 128 or network port 120.

In some embodiments, the controller 110 may include a cache memory, and may use the cache memory as random access memory to process the boot logic. In some embodiments, the cache memory may be a memory block in processor 102 coupled to bus 104. In some embodiments, the firmware 112 may include storage logic 112.3, wherein the controller 110 is to processes the storage logic 112.3 to store in the persistent memory 114 one or more policies of the apparatus. In some embodiments, the one or more policies may include a startup policy that includes boot from a no power status and boot to a full operating system status. In some embodiments, computing apparatus 100 may include a processor 102 with a general input output pin (GIOP) 102.1 with a state, wherein the controller 110 may read the GIOP and set the boot logic 112.1 to run a default boot logic based on the state of the GIOP. In some embodiments, the state of the GIOP is set by a jumper to trigger reset to the default boot logic. In some embodiments, the jumper may be a softstrap or a hardstrap. In some embodiments, the jumper may be used to provide a mechanism to reset the computing apparatus 100 to default boot logic when there is no battery or backup power source connected to the RTC 106. In some embodiments, reset by the jumper may be used to unbrick computing apparatus 100 after being bricked by Intel® Trusted Execution Technology as a result of an actual or perceived security violation.

Figure 2:
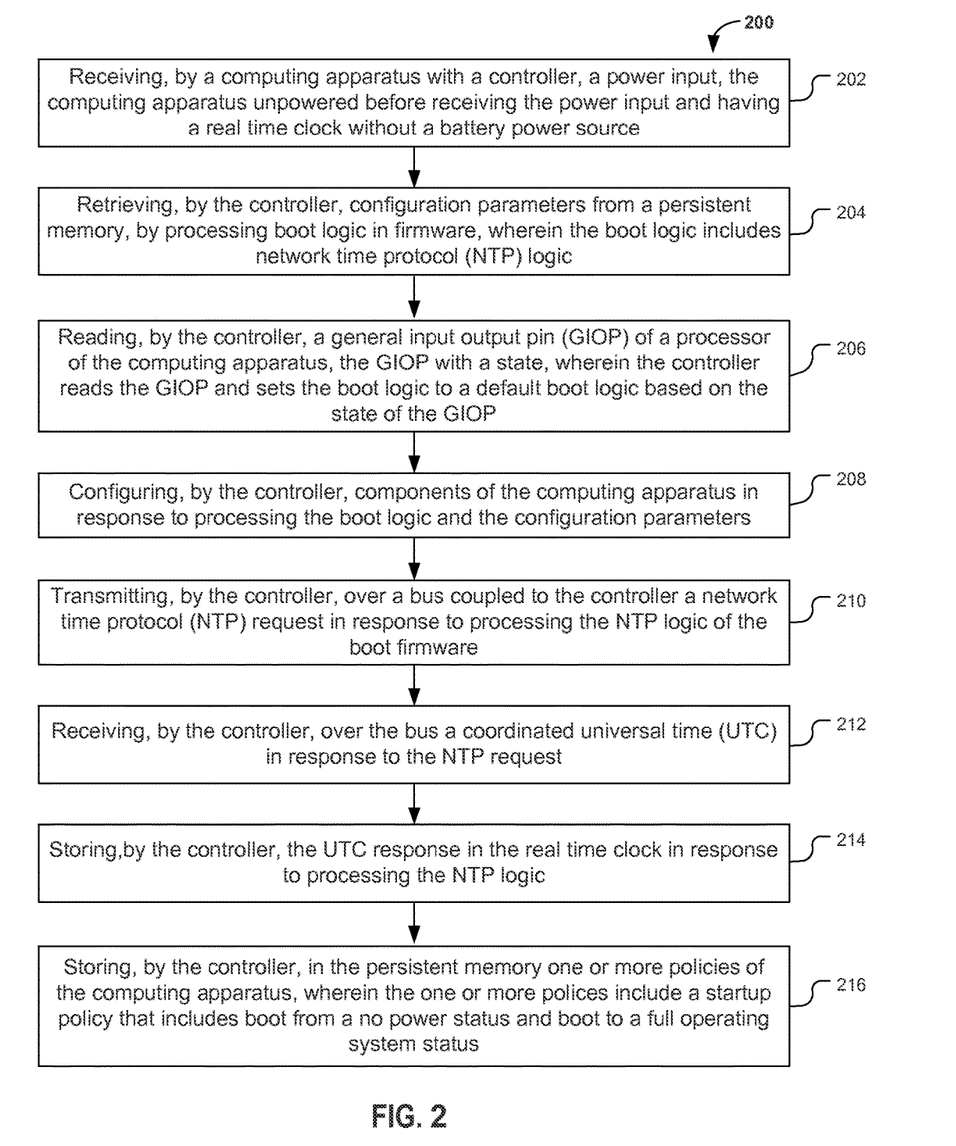
FIG. 2 schematically illustrates a method 200 of setting a real time clock in a computing apparatus where the primary power source that powers the computing apparatus is a power source for the real time clock, in accordance with some embodiments.

FIG. 2 schematically illustrates a method 200 of setting a real time clock in a computing apparatus where the primary power source that powers the computing apparatus is a power source for the real time clock, in accordance with some embodiments. In some embodiments, the method 200 may include receiving 202, by a computing apparatus with a controller, a power input, the computing apparatus unpowered before receiving the power input and having a real time clock (RTC) without a battery power source. The method 200 may further include retrieving 204, by the controller, configuration parameters from a persistent memory, by processing boot logic from a firmware block, wherein the boot logic includes network time protocol (NTP) logic. The method 200 may further include reading 206, by the controller, a general input output pin (GIOP) of a processor of the computing apparatus, the GIOP with a state, wherein the controller reads the GIOP and sets the boot logic to a default boot logic based on the state of the GIOP. The method 200 may further include configuring 208, by the controller, components of the computing apparatus in response to processing the boot logic and the configuration parameters. The method 200 may further include transmitting 210, by the controller, over a bus coupled to the controller a NTP request in response to processing the boot logic with the NTP logic. The method 200 may further include receiving 212, by the controller, over the bus a coordinated universal time (UTC) in response to the NTP request. The method 200 may further include storing 214, by the controller, the UTC response in the RTC in response to processing the NTP logic. The method 200 may further include storing 216, by the controller, in the persistent memory one or more policies of the computing apparatus, wherein the one or more polices include a startup policy that includes boot from a no power status and boot to a full operating system status. In some embodiments of method 200, the bus is coupled to a network port and the NTP request is transmitted over the bus to the network port to a NTP server, wherein the UTC is received over the bus from the network port from the NTP server. In some embodiments of method 200, a baseboard management controller (BMC) is coupled to the bus and the NTP request is transmitted over the bus to the BMC, wherein the UTC is received over the bus from the BMC. In some embodiments, the processing of the boot logic further includes using a cache memory as random access memory. In some embodiments of method 200, the firmware is in a silicon block of a management engine of the apparatus. In some embodiments of method 200, the persistent memory is in a silicon block of a management engine of the apparatus. In some embodiments of method 200, wherein the persistent memory is flash memory.

Figure 3:
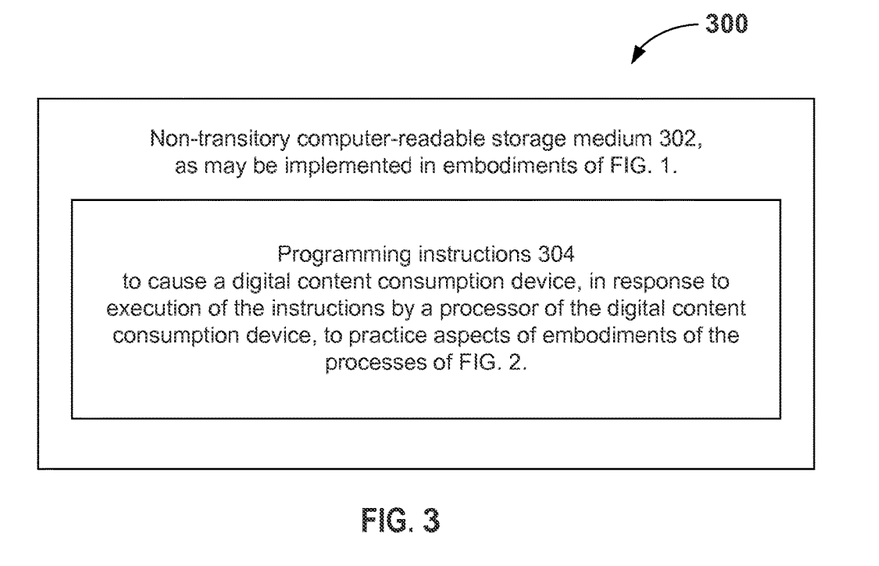
FIG. 3 schematically illustrates a non-transitory computer readable storage medium with programming instructions to cause a computing apparatus, in response to execution of the instructions by a processor of the computing apparatus, to practice aspects of embodiments of the processes for setting a real time clock in the computing apparatus where the primary power source that powers the computing apparatus is a power source for the real time clock, in accordance with some embodiments.

FIG. 3 schematically illustrates a device 300 with a non-transitory computer readable storage medium 302 with programming instructions 304 to cause a computing apparatus, in response to execution of the instructions by a processor of the computing apparatus, to practice aspects of embodiments of the processes for setting a real time clock in the computing apparatus where the primary power source that powers the computing apparatus is a power source for the real time clock, in accordance with some embodiments. In some embodiments, the non-transitory computer readable storage medium (medium) 302 with the programming instructions 304 may be implemented in some embodiments of the computing apparatus 100 illustrated in FIG. 1 to practice aspects of the embodiments of the method 200 illustrated in FIG. 2, as further disclosed and described herein. In some embodiments, the programming instructions 304 may cause the computing apparatus, to process a boot logic with network time protocol (NTP) logic from a firmware block when the computing apparatus receives power from a power input, wherein the computing apparatus is unpowered before the computing apparatus receives power from the power input and has a real time clock (RTC) without a backup battery; retrieve configuration parameters from a persistent memory by processing the boot logic with the NTP logic; transmit over a bus a NTP request in response to processing the boot logic with the NTP logic and the configuration parameters; receive over the bus a coordinated universal time (UTC) in response to the NTP request; and store the UTC response in the RTC in response to processing the NTP logic. In some embodiments, the programming instructions 304 may cause the computing apparatus, further to configure components of the computing apparatus in response to processing the boot logic and the configuration parameters. In some embodiments, the bus may be coupled to a network port and the NTP request is transmitted over the bus to the network port to a NTP server, wherein the UTC is received over the bus from the network port from the NTP server. In some embodiments, a baseboard management controller (BMC) is coupled to the bus and the NTP request is transmitted over the bus to the BMC, wherein the UTC is received over the bus from the BMC. In some embodiments, the programming instructions 304 may cause the computing apparatus, further to store in the persistent memory one or more policies of the computing apparatus, wherein the one or more polices may include a startup policy that includes boot from a no power status and boot to a full operating system status. In some embodiments, the processing of the boot logic further includes using a cache memory as random access memory. In some embodiments, the firmware is in a silicon block of a management engine of the apparatus. In some embodiments, the persistent memory is in a silicon block of a management engine of the apparatus. In some embodiments, the persistent memory is flash memory. In some embodiments, the programming instructions 304 may cause the computing apparatus, further to read a general input output pin (GIOP) of a processor of the computing apparatus, the GIOP with a state, wherein the controller reads the GIOP and sets the boot logic to a default boot logic based on the state of the GIOP.

EXAMPLES

According to various embodiments, the present disclosure describes a number of embodiments related to devices, systems, and methods for setting the time and date of a real time clock (RTC) of a computing apparatus where the RTC is without a backup power source to maintain the time and date of the RTC when there is no primary power source powering the computing apparatus. Set forth below are numerous examples and implementations of the embodiments.

In Example 1 of an apparatus for computing, the apparatus may comprise a real time clock (RTC) coupled to a bus and without a battery to maintain time and date of the real time clock; firmware coupled to the bus and to contain boot logic with network time protocol (NTP) logic; persistent memory coupled to the bus and with configuration parameters; and a controller coupled to the bus and to retrieve the configuration parameters from the persistent memory, wherein the controller is to process the boot logic with the NTP logic using the configuration parameters to transmit an NTP request over the bus and to receive a coordinated universal time (UTC) over the bus and to store the UTC in the RTC.

Example 2 may include the subject matter of Example 1 and other examples herein, wherein the controller may further process the boot logic with the NTP logic using the configuration parameters to set parameters of components of the apparatus.

Example 3 may include the subject matter of Example 1 and other examples herein, wherein the apparatus for computing may further comprise a network port coupled to the bus, wherein the controller may transmit the NTP request over the network port to a NTP server and may be received over the network port from the NTP server the UTC.

Example 4 may include the subject matter of Example 1 and other examples herein, wherein the apparatus for computing may further comprise a baseboard management controller (BMC) coupled to the bus, wherein the controller is to transmit the NTP request over the bus to the BMC and the controller is to receive from the BMC the UTC.

Example 5 may include the subject matter of Example 1 and other examples herein, wherein the controller may comprise a cache memory, and may use the cache memory as random access memory to process the boot logic.

Example 6 may include the subject matter of Example 1 and other examples herein, wherein the firmware may include storage logic, wherein the controller may process the storage logic to store in the persistent memory one or more policies of the apparatus.

Example 7 may include the subject matter of Example 6 and other examples herein, wherein the one or more policies may include a startup policy that includes boot from a no power status and boot to a full operating system status.

Example 8 may include the subject matter of Example 1 and other examples herein, wherein the firmware may be in a silicon block of a management engine of the apparatus.

Example 9 may include the subject matter of Example 1 and other examples herein, wherein the persistent memory may be in a silicon block of a management engine of the apparatus.

Example 10 may include the subject matter of Example 1 and other examples herein, wherein the persistent memory may be a flash memory.

Example 11 may include the subject matter of any one of Examples 1-10 and other examples herein, wherein the apparatus for computing may further comprise a processor with a general input output pin (GIOP) with a state, wherein the controller may read the GIOP and may set the boot logic to a default boot logic based on the state of the GIOP.

In Example 12 of a method for setting a real time clock of a computing apparatus, the method may comprise receiving, by a computing apparatus with a controller, a power input, the computing apparatus may be unpowered before receiving the power input and may have a real time clock (RTC) without a backup battery; retrieving, by the controller, configuration parameters from a persistent memory, by processing boot logic from a firmware block, wherein the boot logic may include network time protocol (NTP) logic; transmitting, by the controller, over a bus coupled to the controller a NTP request in response to processing the boot logic with the NTP logic; receiving, by the controller, over the bus a coordinated universal time (UTC) in response to the NTP request; and storing, by the controller, the UTC response in the RTC in response to processing the NTP logic.

Example 13 may include the subject matter of Example 12 and other examples herein, wherein the method may further comprise configuring, by the controller, components of the computing apparatus in response to processing the boot logic and the configuration parameters.

Example 14 may include the subject matter of Example 12 and other examples herein, wherein the method may further comprise storing, by the controller, in the persistent memory one or more policies of the computing apparatus, wherein the one or more polices may include a startup policy that includes boot from a no power status and boot to a full operating system status.

Example 15 may include the subject matter of Example 12 and other examples herein, wherein the bus may be coupled to a network port and the NTP request may be transmitted over the bus to the network port to a NTP server, wherein the UTC may be received over the bus from the network port from the NTP server.

Example 16 may include the subject matter of Example 12 and other examples herein, wherein a baseboard management controller (BMC) may be coupled to the bus and the NTP request may be transmitted over the bus to the BMC, wherein the UTC may be received over the bus from the BMC.

Example 17 may include the subject matter of Example 12 and other examples herein, wherein the processing of the boot logic further includes using a cache memory as random access memory.

Example 18 may include the subject matter of Example 12 and other examples herein, wherein the firmware may be in a silicon block of a management engine of the apparatus.

Example 19 may include the subject matter of Example 12 and other examples herein, wherein the persistent memory may be in a silicon block of a management engine of the apparatus.

Example 20 may include the subject matter of Example 12 and other examples herein, wherein the persistent memory may be flash memory.

Example 21 may include the subject matter of any one of Examples 12-20 and other examples herein, wherein the method may further comprise reading, by the controller, a general input output pin (GIOP) of a processor of the computing apparatus, the GIOP with a state, wherein the controller may read the GIOP and set the boot logic to a default boot logic based on the state of the GIOP.

In Example 22 of one or more non-transitory computer readable media comprising instructions to cause a computing apparatus, in response to execution of the instructions by a processor of the computing apparatus, the non-transitory computer readable media may cause the apparatus to process a boot logic with network time protocol (NTP) logic from a firmware block when the computing apparatus receives power from a power input, wherein the computing apparatus may be unpowered before the computing apparatus receives power from the power input and may have a real time clock (RTC) without a backup battery; retrieve configuration parameters from a persistent memory by processing the boot logic with the NTP logic; transmit over a bus a NTP request in response to processing the boot logic with the NTP logic and the configuration parameters; receive over the bus a coordinated universal time (UTC) in response to the NTP request; and store the UTC response in the RTC in response to processing the NTP logic.

Example 23 may include the subject matter of Example 22 and other examples herein, wherein the non-transitory computer readable media may further comprise instructions to cause the computing apparatus, in response to execution of the instructions by the processor of the computing apparatus, to configure components of the computing apparatus in response to processing the boot logic and the configuration parameters.

Example 24 may include the subject matter of Example 22 and other examples herein, wherein the bus may be coupled to a network port and the NTP request may be transmitted over the bus to the network port to a NTP server, wherein the UTC may be received over the bus from the network port from the NTP server.

Example 25 may include the subject matter of Example 22 and other examples herein, wherein a baseboard management controller (BMC) may be coupled to the bus and the NTP request may be transmitted over the bus to the BMC, wherein the UTC may be received over the bus from the BMC.

Example 26 may include the subject matter of Example 22 and other examples herein, wherein the non-transitory computer readable media may further comprise instructions to cause the computing apparatus, in response to execution of the instructions by the processor of the computing apparatus, to store in the persistent memory one or more policies of the computing apparatus, wherein the one or more polices include a startup policy that includes boot from a no power status and boot to a full operating system status.

Example 27 may include the subject matter of Example 22 and other examples herein, wherein the processing of the boot logic further may include using a cache memory as random access memory.

Example 28 may include the subject matter of Example 22 and other examples herein, wherein the firmware may be in a silicon block of a management engine of the apparatus.

Example 29 may include the subject matter of Example 22 and other examples herein, wherein the persistent memory may be in a silicon block of a management engine of the apparatus.

Example 30 may include the subject matter of Example 22 and other examples herein, wherein the persistent memory may be flash memory.

Example 31 may include the subject matter of one of Examples 2230 and other examples herein, wherein the non-transitory computer readable media may further comprise instructions to cause the computing apparatus, in response to execution of the instructions by the processor of the computing apparatus, to read a general input output pin (GIOP) of a processor of the computing apparatus, the GIOP with a state, wherein the controller reads the GIOP and sets the boot logic to a default boot logic based on the state of the GIOP.

In Example 32 of a computing apparatus, the computing apparatus may comprise receive means for receiving a power input to the computing apparatus, the computing apparatus may be unpowered before receiving the power input and with a real time clock (RTC) with receive means for receiving power from the power input and without a backup battery; retrieve means for retrieving configuration parameters from a persistent memory, by processing boot logic from a firmware block, wherein the boot logic may include network time protocol (NTP) logic; transmit means for transmitting over a bus coupled to the controller a NTP request in response to processing the boot logic with the NTP logic; receive means for receiving over the bus a coordinated universal time (UTC) in response to the NTP request; and store means for storing the UTC response in the RTC in response to processing the NTP logic.

Example 33 may include the subject matter of Example 32 and other examples herein, wherein the bus may be coupled to a network port and the NTP request may be transmitted over the bus to the network port to a NTP server, wherein the UTC may be received over the bus from the network port from the NTP server.

Example 34 may include the subject matter of Example 32 and other examples herein, wherein a baseboard management controller (BMC) may be coupled to the bus and the NTP request may be transmitted over the bus to the BMC, wherein the UTC may be received over the bus from the BMC.

Example 35 may include the subject matter of Example 32 and other examples herein, wherein the computing apparatus further may comprise configure means for configuring components of the computing apparatus in response to processing the boot logic and the configuration parameters.

Example 36 may include the subject matter of Example 32 and other examples herein, wherein the computing apparatus further may comprise store means for storing in the persistent memory one or more policies of the computing apparatus, wherein the one or more polices include a startup policy that includes boot from a no power status and boot to a full operating system status.

Example 37 may include the subject matter of Example 32 and other examples herein, wherein the processing of the boot logic further includes using a cache memory as random access memory.

Example 38 may include the subject matter of Example 32 and other examples herein, wherein the firmware may be in a silicon block of a management engine of the apparatus.

Example 39 may include the subject matter of Example 32 and other examples herein, wherein the persistent memory may be in a silicon block of a management engine of the apparatus.

Example 40 may include the subject matter of Example 32 and other examples herein, wherein the persistent memory may be flash memory.

Example 41 may include the subject matter of any one of Examples 32-40 and other examples herein, wherein the computing apparatus further may comprise read means for reading a general input output pin (GIOP) of a processor of the computing apparatus, the GIOP with a state, wherein the controller reads the GIOP and sets the boot logic to a default boot logic based on the state of the GIOP.

The foregoing description of one or more implementations provides illustration and description, but is not intended to be exhaustive or to limit the scope of the embodiments to the precise form disclosed or claimed herein. Modifications and variations are possible in light of the above teachings or may be acquired from practice of various implementations of the various embodiments. Future improvements, enhancements, or changes to particular components, methods, or means described in the various embodiments are contemplated to be within the scope of the claims and embodiments described herein, as would readily be understood by a person having ordinary skill in the art.

What is claimed is:

1. An apparatus for computing, comprising:
    a real time clock (RTC) coupled to a bus and without a battery to maintain time and date of the real time clock;
    firmware coupled to the bus and to contain boot logic with network time protocol (NTP) logic;
    persistent memory coupled to the bus and with configuration parameters;
    a controller coupled to the bus and to retrieve the configuration parameters from the persistent memory, wherein the controller is to process the boot logic with the NTP logic using the configuration parameters to transmit an NTP request over the bus and to receive a coordinated universal time (UTC) over the bus and to store the UTC in the RTC;
    a baseboard management controller (BMC) directly coupled to the bus, wherein the BMC is to receive the NTP request from the controller and to transmit to the controller the UTC; and
    wherein the BMC is to transmit the NTP request outside a computing rack in which the apparatus is located.

2. The apparatus of claim 1, wherein the controller is further to process the boot logic with the NTP logic using the configuration parameters to set parameters of components of the apparatus.

3. The apparatus of claim 1, further comprising:
    a network port coupled to the bus, wherein the controller is to transmit the NTP request over the network port to an NTP server and to receive over the network port from the NTP server the UTC.

4. The apparatus of claim 1, wherein the controller comprises a cache memory, and uses the cache memory as random access memory to process the boot logic.

5. The apparatus of claim 1, wherein the firmware includes storage logic, wherein the controller is to process the storage logic to store in the persistent memory one or more policies of the apparatus.

6. The apparatus of claim 5, wherein the one or more policies include a startup policy that includes boot from a no power status and boot to a full operating system status.

7. The apparatus of claim 1, wherein the firmware is in a silicon block of a management engine of the apparatus.

8. The apparatus of claim 1, wherein the persistent memory is in a silicon block of a management engine of the apparatus.

9. The apparatus of claim 1, wherein the persistent memory is flash memory.

10. The apparatus of claim 1, further comprising:
    a processor with a general input output pin (GIOP) with a state; and
    wherein the controller is further to read the GIOP and to set the boot logic to a default boot logic based on the state of the GIOP.

11. A method for setting a real time clock of a computing apparatus, comprising:
    receiving, by a computing apparatus with a controller, a power input, the computing apparatus unpowered before receiving the power input and having a real time clock (RTC) without a backup battery;
    retrieving, by the controller, configuration parameters from a persistent memory, by processing boot logic from a firmware block, wherein the boot logic includes network time protocol (NTP) logic;
    transmitting, by the controller, over a bus coupled to the controller an NTP request in response to processing the boot logic with the NTP logic to a baseboard management controller (BMC) directly coupled to the bus, wherein a coordinated universal time (UTC) is received over the bus and wherein the BMC is to transmit the NTP request outside a computing rack in which the computing apparatus is located;
    receiving, by the controller, over the bus the UTC from the BMC in response to the NTP request; and
    storing, by the controller, the UTC response in the RTC in response to processing the NTP logic.

12. The method of claim 11, further comprising:
    configuring, by the controller, components of the computing apparatus in response to processing the boot logic and the configuration parameters.

13. The method of claim 11, further comprising:
    storing, by the controller, in the persistent memory one or more policies of the computing apparatus, wherein the one or more polices include a startup policy that includes boot from a no power status and boot to a full operating system status.

14. The method of claim 11, wherein the bus is coupled to a network port and the NTP request is transmitted over the bus to the network port to an NTP server, wherein the UTC is received over the bus from the network port from the NTP server.

15. The method of claim 11, wherein the processing of the boot logic further includes using a cache memory as random access memory.

16. The method of claim 11, wherein the firmware block is in a silicon block of a management engine of the computing apparatus.

17. The method of claim 11, wherein the persistent memory is in a silicon block of a management engine of the computing apparatus.

18. The method of claim 11, wherein the persistent memory is flash memory.

19. The method of claim 11, further comprising:
reading, by the controller, a general input output pin (GIOP) of a processor of the computing apparatus, the GIOP with a state, wherein the controller reads the GIOP and sets the boot logic to a default boot logic based on the state of the GIOP.

20. One or more non-transitory computer readable media comprising instructions to cause a computing apparatus, in response to execution of the instructions by a processor of the computing apparatus, to:
process a boot logic with network time protocol (NTP) logic from a firmware block when the computing apparatus receives power from a power input, wherein the computing apparatus is unpowered before the computing apparatus receives power from the power input and has a real time clock (RTC) without a backup battery;
retrieve configuration parameters from a persistent memory by processing the boot logic with the NTP logic;
transmit over a bus an NTP request to a baseboard management controller (BMC) in response to processing the boot logic with the NTP logic and the configuration parameters, wherein the BMC is directly coupled to the bus, and wherein the BMC is to transmit the NTP request outside a computing rack in which the computing apparatus is located;
receive over the bus from the BMC a coordinated universal time (UTC) in response to the NTP request; and
store the UTC response in the RTC in response to processing the NTP logic.

21. The non-transitory computer readable media of claim 20, further comprising instructions to cause the computing apparatus, in response to execution of the instructions by the processor of the computing apparatus, to:
configure components of the computing apparatus in response to processing the boot logic and the configuration parameters.

22. The non-transitory computer readable media of claim 20, wherein the bus is coupled to a network port and the NTP request is transmitted over the bus to the network port to an NTP server, wherein the UTC is received over the bus from the network port from the NTP server.

* * * * *